July 14, 1925.
C. M. CRANE ET AL
1,545,885
ANTISKID APPARATUS FOR AUTOMOBILES
Filed Nov. 2, 1922
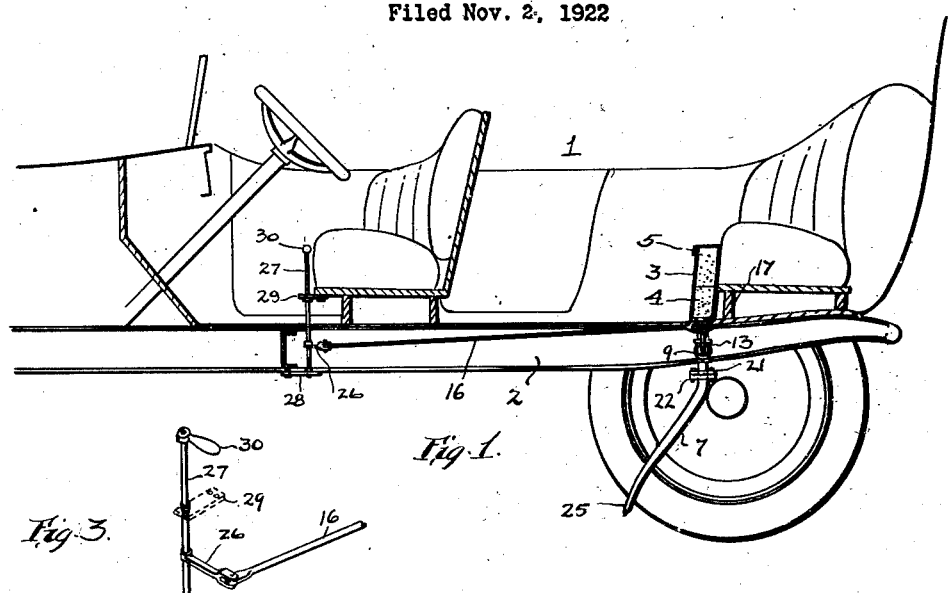
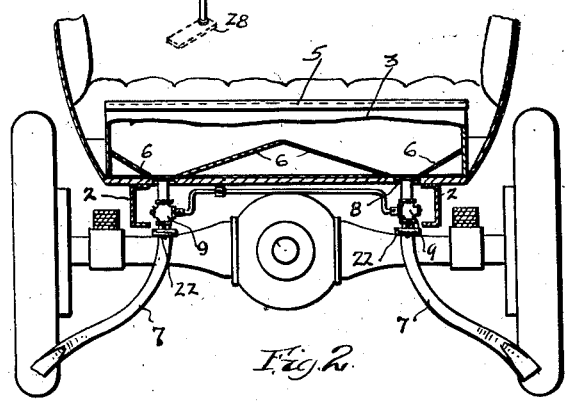
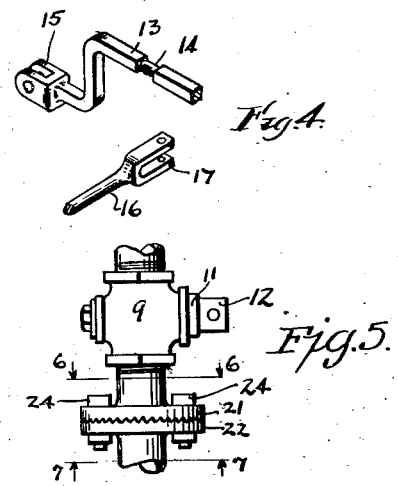
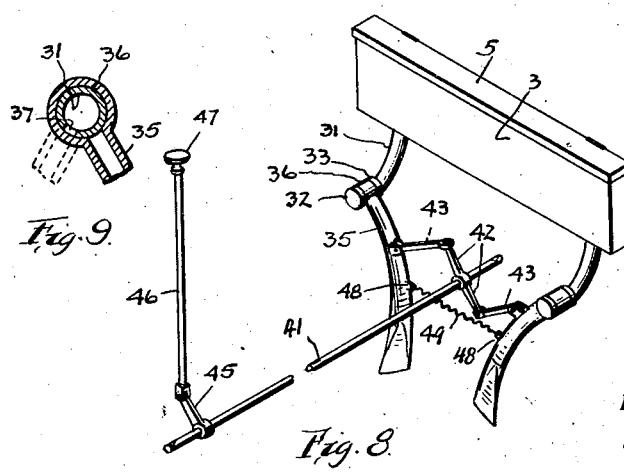
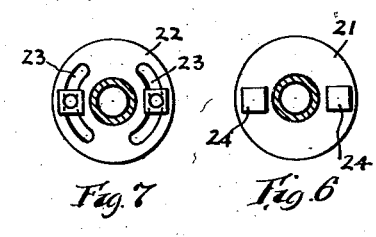
INVENTORS
Charles M. Crane and
BY Frederick W. Blatz
Ray, Oberlin & Ray
ATTORNEYS Patented July 14, 1925.

1,545,885

UNITED STATES PATENT OFFICE.

CHARLES M. CRANE, OF EAST CLEVELAND, AND FREDERICK W. BLATZ, OF CLEVELAND, OHIO.

ANTISKID APPARATUS FOR AUTOMOBILES.

Application filed November 2, 1922. Serial No. 598,596.

*To all whom it may concern:*

Be it known that we, CHARLES M. CRANE and FREDERICK W. BLATZ, both citizens of the United States, and residents of East Cleveland, county of Cuyahoga, and State of Ohio, and of Cleveland, county of Cuyahoga, and State of Ohio, respectively, have jointly invented a new and useful Improvement in Antiskid Apparatus for Automobiles, of which the following is a specification, the principle of the invention being herein explained and the best mode in which we have contemplated applying that principle, so as to distinguish it from other inventions.

This invention relates to an anti-skid apparatus for automobiles. More particularly it involves the application of an apparatus to automobiles which is adapted to distribute gritty material in front of the wheels of the vehicles to insure their having the proper frictional contact with the surface of the roadway.

It is the present practice to equip the wheels of automobiles with chains, cleats and like devices to prevent their skidding. It often happens, however, that a slippery road surface is traveled over before its dangerous character is fully realized and that a serious accident occurs before such antiskid devices can be applied to the automobile.

The object of our invention is to provide a simple apparatus capable of effectively checking the skid of an automobile after it commences, as well as preventing skidding by suitably treating the road surface in advance of the wheels. Further objects of our invention will appear in the course of the following description. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a longitudinal sectional elevation of an automobile equipped with the invention; Fig. 2 is a transverse sectional elevation taken through an automobile at a point slightly in advance of the rear wheels; Fig. 3 is a diagrammatic perspective view showing the lever for operating the apparatus; Fig. 4 is a fragmentary perspective view showing details of the crank rod and its operating link connection; Fig. 5 is an enlarged detail side elevation of the valve and the conduit positioning device; Figs. 6 and 7 are top and bottom views, respectively, of the conduit positioning device as viewed along the lines 6—6 and 7—7, respectively, shown in Fig. 5 looking in the direction of the arrows; Fig. 8 is a perspective view showing a modified form of the invention; and Fig. 9 is a detail view of the combined conduit supporting means and valve as embodied in the apparatus shown in Fig. 8.

As is clearly shown in Figs. 1 and 2 of the drawing, the device may be applied to an automobile 1, having the usual longitudinal frame 2, upon which is supported the body, in the present instance a touring car. It is to be understood, however, that the device is equally applicable to the roadster type of body, as well as the various enclosed bodies and trucks and commercial bodies.

In the form of the apparatus illustrated, a hopper 3, comprising a long, narrow, rectangular receptacle for gritty material indicated at 4 and provided with a cover plate 5 at its upper side and inclined bottom surfaces 6, has connected with its lower sides, adjacent the points of convergence of the respective inclined bottom surfaces, a pair of conduits 7. The conduits at their upper ends have flanged fittings 8 secured thereto whereby they may be firmly attached to the under side of the hopper. Closely adjacent the point of connection with the hopper the conduits are provided with valves 9 of any suitable form. The valves shown have rotatable plugs 11 having centrally perforated flattened projections 12 adapted to be secured to the respective ends of a crank rod 13. The crank rod, as more clearly shown in Fig. 4, is formed of a piece of metal stock of rectangular cross section and is provided with a cylindrical portion 14 adjacent one end. The ends of the crank rod comprise enlarged terminals 15 slotted to engage over the projecting ends of the valve plugs and adapted to be secured thereto by means of a pin passing through the registering apertures in said terminals and said valve plug extensions. The crank rod is adapted to be actuated by means of an operating link 16, the slotted terminal 17 of which is of a size to engage over the cylindrical portion 14 of the crank rod and to be positioned there-over by means of a pin secured in the apertures formed adjacent the rear edges of said slotted portion.

Immediately beneath the respective valves the conduits are provided with extension flanges 21, 22. These flanges have their contacting faces provided with interengaging projections and notches. The lower flange 22 is provided with arcuate slots 23 and the upper flange with bolt holes in registry with said slots. A pair of bolts 23 serves to hold the flanges in secure contact with each other after the lower ends of the conduits have been turned to the proper position in relation to the adjacent wheels of the automobile. The lower ends 25 of the spouts are preferably flattened so as to spread the gritty material over the surface of the roadway in a broad, flat stream.

The forward end of the operating rod 16 is pivotally connected to a crank arm 26 secured to a shaft 27 positioned adjacent the driver's seat of the automobile. The shaft is rotatably secured to the frame of the automobile by means of a bracket 28, and has a second bracket 29 connected with the forward portion of the driver's seat. The upper end of the shaft is provided with a handle 30 within convenient reach of the driver of the automobile.

In the modified form of construction illustrated in Figs. 8 and 9, each conduit comprises an upper section 31 extending downwardly from the hopper and having its lower end bent at a somewhat oblique angle thereto. The outer ends of these sections are closed by means of a flanged cap 32, and, between the flanges of the cap and a collar 33 fitted upon the angularly disposed portion of the upper section of the conduit, the lower section of the conduit is supported. This lower section comprises a tubular portion 35 having its lower end flattened so as to form a broad, flat spout-like terminal and having its upper end provided with a transverse sleeve 36. As has been explained, the sleeve of each lower section of the conduit is engaged over the lower end of the upper section of the conduit. A long, narrow slot 37 in the upper section of the conduit serves as a means of communication between said section and the lower section when said parts are brought into registry. The slots are so disposed that material will be fed through the conduit only when the lower sections of the conduit are outwardly positioned adjacent the wheels of the automobile.

The means for moving the lower sections of the conduits to operative position comprise a shaft 41 provided adjacent its rearward end with a pair of crank arms 42 connected by means of links 43 with the respective lower portions of the conduits. At the forward end of the shaft a crank arm 45 is provided, at the free end of which an operating rod 46 is pivotally connected. The upper end of the operating rod preferably is provided with a knob or handle 47 of a shape suitable to be engaged by the hand or elbow of the driver of the automobile.

A pair of ears 48 is formed on the inner sides of the lower sections of the conduits directly opposite each other and a coil spring 49, connected to said ears, serves to hold said conduits in their innermost position and said operating rod in elevated position.

The operation of the device has been partly indicated in the description of the construction. It may be explained, however, that with the form of the device first described, the turning of the handle adjacent the driver's seat to a forward position serves to turn the rotary plugs of the valves to open position and permit sand or other gritty material, held within the hopper, to flow downwardly through the conduits to the road surface. The position of the conduits is such that the gritty material will be distributed in the path of travel of the wheels and non-slipping contact between the wheels and the road surface will be insured. The spouts may be very accurately adjusted for particular types of machines or particular road conditions so that the gritty material will be satisfactorily distributed over a sufficient area to insure the safe progress of the automobile across a dangerous section of roadway. The device is not only suitable for wet or icy paving but is of much value as well upon roadways having occasional sections of moist clay or a similar soft surface. When the desired amount of gritty material has been released, the handle is restored to its position against the driver's seat and the supply of material is thereby shut off.

In the use of the modified form of the device the lower sections of the conduit are moved from an inner position to a position slightly outwardly of the wheels and the several portions of the conduit constitute valve sections so that the movement of the lower portions of the conduits serves to open the ports through which the gritty material will flow to the road surface. This discharge of the material upon the surface of the road may be accomplished very rapidly by the driver striking his hand or elbow upon the terminal 47. By maintaining the pressure upon the knob the gritty material will continue to be discharged through the conduit as long as desired. Upon the release of such pressure the spring connecting the lower ends of the conduits will move them to their inner position and will automatically cut off the flow of gritty material.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In an automobile the combination of a hopper for gritty material secured adjacent the rearward portion thereof, conduits connected with said hopper having pivotally supported outer sections and means for laterally swinging the outer sections of said conduits in front of the driving wheels of said automobile and releasing gritty material from said hopper and through said conduits to the road surface in the path of said driving wheels.

2. In an automobile the combination of a hopper for gritty material secured adjacent the rearward portion thereof, conduits connected with said hopper having pivotally supported outer sections, means for laterally positioning the outer sections of said conduits in front of the driving wheels of said automobile and means for releasing gritty material from said hopper and through said conduits to the road surface in the path of said driving wheels.

3. In an automobile the combination of a hopper for gritty material secured adjacent the rearward portion thereof, conduits connected with said hopper having pivotally supported outer sections, and means for simultaneously moving said outer sections laterally and releasing gritty material from said hopper and through said conduits to the road surface in the path of said driving wheels.

4. In an automobile the combination of a hopper for gritty material secured above the floor and within the body portion of said automobile above the rear axle, a pair of conduits connected with said hopper having rotatably movable outer end sections, means permitting the lateral movement of the outer end sections of said conduits to a position in front of the driving wheels of said automobile, means extending longitudinally beneath said floor for releasing gritty material from said hopper through said conduits to the road surface in the path of said driving wheels, and a vertical push rod extending upwardly to a position adjacent the driver's elbow for operating said material releasing means.

Signed by us, this 31st day of October, 1922.

CHARLES M. CRANE.
FREDERICK W. BLATZ.